United States Patent [19]

Page

[11] 4,355,938
[45] Oct. 26, 1982

[54] AUTOMATIC WORK PIECE CHANGER FOR A MILLING MACHINE AND THE LIKE

[76] Inventor: Jeffrey L. Page, 658 Cambridge Dr., Santa Clara, Calif. 95051

[21] Appl. No.: 45,339

[22] Filed: Jun. 4, 1979

[51] Int. Cl.³ ............................................. B65G 63/00
[52] U.S. Cl. ................................. 414/222; 414/750; 414/900; 198/345; 221/224; 221/242
[58] Field of Search .............. 414/222, 131, 900, 750, 414/225; 198/345, 741, 744, 339; 221/224, 225, 241, 242

[56] References Cited

U.S. PATENT DOCUMENTS

| | | | |
|---|---|---|---|
| 2,851,145 | 9/1958 | Gagnon | 198/345 |
| 2,861,676 | 11/1958 | Rasmussen et al. | 198/744 |
| 3,888,341 | 6/1975 | Konkal et al. | 198/345 |

Primary Examiner—Joseph J. Rolla
Attorney, Agent, or Firm—Warren M. Becker

[57] ABSTRACT

An automatic work piece changer for a milling machine and the like is described. In the work piece changer there is provided a work piece hopper (2) for storing a plurality of work pieces to be movable, a carriage assembly (3) for removing work pieces from the hopper (2) to a work station where they are machined, a clamping assembly (6) for holding each of the work pieces in the work station so as to prevent their movement during the machining thereof and an ejecting assembly (60) for ejecting machined work pieces from the changer after they are machined. Operation of the work piece changer is controlled by signals received from the milling machine in a conventional manner.

32 Claims, 12 Drawing Figures

AUTOMATIC WORK PIECE CHANGER FOR A MILLING MACHINE AND THE LIKE

BACKGROUND OF THE INVENTION

The present invention relates to automatic machinery in general and in particular to an automatic work piece changer for changing work pieces in a milling machine and the like.

Milling machines and other types of vertical and horizontal machining equipment are used for machining work pieces of varying size and shape. Conventional milling machines may be either manual or automatic. Modern automatic milling machines are typically computer-controlled, often in three degrees of freedom. When they are so controlled, the machines will automatically mill a work piece in a longitudinal, lateral and vertical direction in response to signals corresponding to predetermined distances in each of said directions. Because of their speed and accuracy, and because of the time and cost involved in generating programs for automatic milling machines, such machines are particularly useful for repetitive machining operations.

Heretofore, to use a modern automatic computer-controlled milling machine and the like for repetitive machining operations, an operator has been generally required to be in continuous attendance. In practice, the duties of such an operator are relatively minimal, being limited to loading the machine with new work pieces to be machined, removing from the machine machined work pieces and actuating the control for initiating each cycle of operation.

In studies of the time that it takes for an operator of an automatic computer-controlled milling machine to reload the machine and initiate a new cycle of operation during repetitive machining operations wherein the work pieces are relatively small blocks of precision stock, it is found that the minimum time for each operation is about 20 seconds. If it is possible to reduce the time it takes to change a work piece in an automatic computer-controlled milling machine and the like, considerable savings in machine time and labor costs can be realized.

SUMMARY OF THE INVENTION

In view of the foregoing, a principal object of the present invention is an automatic work piece changer for milling machines and the like.

In accordance with the above object, there is provided an automatic work piece changer having means forming a hopper for storing precision blanks, a pair of adjustable spaced rail members, an intermediate carriage assembly for moving the blanks on the rail members from the hopper to a work station where they are machined, a top clamping assembly for clamping the work pieces as they are being moved from the hopper to the work station and means for clamping the work pieces between the rail members at the work station for preventing their movement during machining.

To accommodate work pieces of different sizes, all of the components of the work piece changer are adjustable.

In operation, so long as the hopper is filled, the automatic work piece changer is able to operate indefinitely in response to signals received from the milling machine and the like to which it is attached. In each cycle of operation a work piece is engaged by the carriage assembly at the hopper and moved on the rail members to the work station. At the same time, a machined work piece at the work station is also engaged by the carriage assembly and moved off the rails by an ejector assembly.

Once at the work station, the rail members are closed for clamping the work piece securely during machining. After the work piece is clamped at the work station, the carriage assembly is withdrawn in preparation for the next cycle of operation. The termination of each machining operation and the separation of the tool from the work piece initiates each cycle of operation.

BRIEF DESCRIPTION OF THE DRAWING

The above and other objects, features and advantages of the present invention will become apparent from the following detailed description of the accompanying drawing in which.

DETAILED DESCRIPTION OF THE DRAWING

Figure 1:
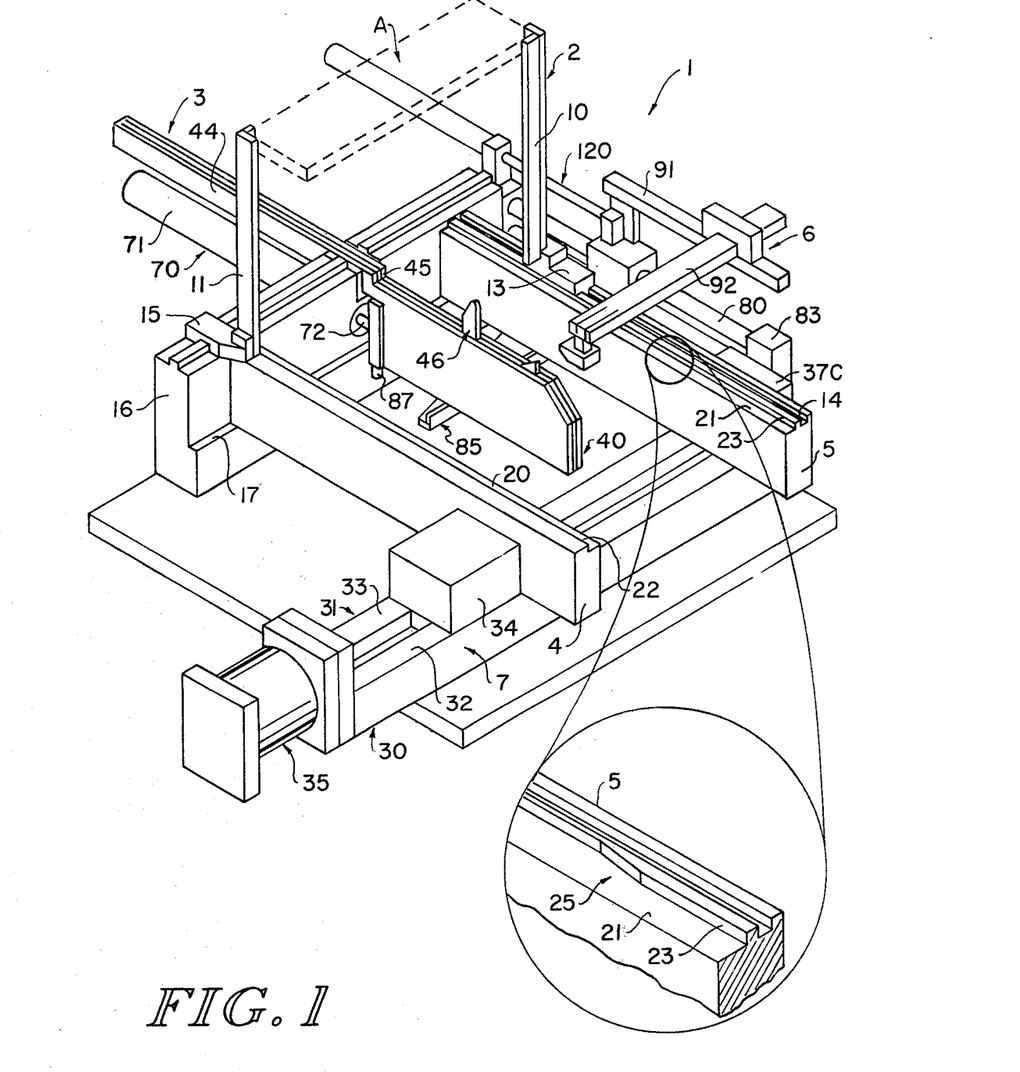
FIG. 1 is a perspective view of an automatic work piece changer for milling machines and the like according to the present invention.

Referring to FIG. 1, there is provided in accordance with the present invention an automatic work piece changer designated generally as 1. In the changer 1, there is provided a work piece hopper designated generally as 2. The work piece hopper 2 is provided for storing a plurality of work pieces to be machined, such as, for example, the work piece designated A and indicated in broken lines. Generally, the work pieces comprise precision blanks machined to a tolerance of approximately ±0.005 inches. Located beneath the hopper 2 and generally in the center thereof and extending forwardly toward the front of the changer 1 there is provided an elongated carriage assembly designated generally as 3. The carriage assembly 3 is provided for moving work pieces from the hopper 2 to a work station at the forward end of the changer 1. The work station is the location at which each work piece is held for machining. Extending generally parallel to the carriage assembly 3, and on opposite sides thereof, there is provided a pair of rail members 4 and 5. The rail members 4 and 5 are adjustably supported at their rear end by a supporting member 16. Mounted generally along the rail member 5 and extending over the top of rail 5 and the carriage assembly 3, there is provided a top clamping assembly designated generally as 6. To hold each of the work pieces at the work station so as to prevent their movement during the machining thereof, there is provided, coupled to the rail member 4, a movable clamping assembly designated generally as 7.

In the hopper 2 there is provided a pair of spaced elongated L-shaped members 10 and 11 for holding the work pieces in a vertically orientated stack. The L- shaped elongated member 10 is mounted to an adjusting block 13, slidably mounted in a groove 14 provided therefor in the top of the rail 5. The block 13 and member 10 are movable in a direction parallel to the longitudinal axis of the rail 5 to accommodate work pieces of differing widths. Similarly, the base of the elongated member 11 is mounted to an adjusting block 15. The adjusting block 15 is slidably mounted to the top of the supporting member 16 and in registration with the rear end of the rail member 4. In operation, the member 11 is adjustable in position perpendicular to the longitudinal axes of rail members 4 and 5 to accommodate work pieces of differing lengths. Because of their relative positions in the changer 1, the member 10 is considered the forward hopper member and the member 11 is considered the rear hopper member. To accommodate the passage of single work pieces therebeneath, the member 10, in addition to being adjustable in a direction parallel to the longitudinal axes of the rail members 4 and 5, is also adjustable in a vertical direction so that the work pieces in the hopper 2 can pass beneath the lower edge of the member 10 as they are transported by the carriage assembly 3 to the work station. As shown in FIG. 1, the legs of the members 10 and 11 are designed and positioned to slidably engage opposite corners of the work pieces stored in the hopper 2. Depending on the particular shape of the work pieces, the legs of the members 10 and 11 may be adjusted correspondingly.

The rail members 4 and 5, that are supported by the supporting member 16, are supported on a shoulder 17 provided therefor on the member 16. At their forward end, the rail members 4 and 5 are supported by the clamping assembly 7. On their top, the rail members 4 and 5 are provided with a horizontal surface 20 and 21, respectively. The surfaces 20 and 21 are provided for providing vertical support for the work pieces as they are moved from the hopper 2 to the work station. Extending vertically from the outside edge of the horizontal surfaces 20 and 21, the rail members 4 and 5 are provided with side walls 22 and 23, respectively. The side walls 22 and 23 are provided for guiding the work pieces laterally as the work pieces are moved along the rail members.

Referring to the enlargment of the top portion of the rail 5, shown in FIG. 1, there is provided an offset indicated generally at 25 in the side wall of the rail 5. The offset 25 comprises a tapered surface leading to a portion of said side wall 23 which is provided with a predetermined offset toward the other side wall 22 at a predetermined location between the hopper 2 and the work station. The offset is approximately 0.01 inches and the tapered surface leading to the offset is approximately one inch long. The offset is provided for increasing the distance between the side walls 22 and 23 under the hopper 2 when the rails are clamping a work piece. This is done so that a succeeding work piece in the hopper 2 can drop down from the hopper 2 between the side walls 22 and 23 of the rails 4 and 5 when the carriage assembly 3 is returned to its initial position.

To accommodate work pieces of different lengths, the rail member 4 is movable laterally relative to the rail member 5 on the clamping assembly 7. As will be described in further detail with respect to FIG. 5, there is provided in the clamping assembly 7 a pair of elongated rail members 30 and 31. The rail members 30 and 31 comprise machined upper surfaces 32 and 33, respectively. Mounted on top of the rail members 30 and 31, for sliding on the surfaces 32 and 33, there is a vise jaw member 34. The rail 4 is rigidly mounted to the vise jaw member 34. To move the jaw member 34 and the rail member 4, the jaw member 34 is coupled to a cylinder and piston assembly designated generally as 35. The assembly 35 may be either pneumatic or hydraulic.

Figures 2, 4:
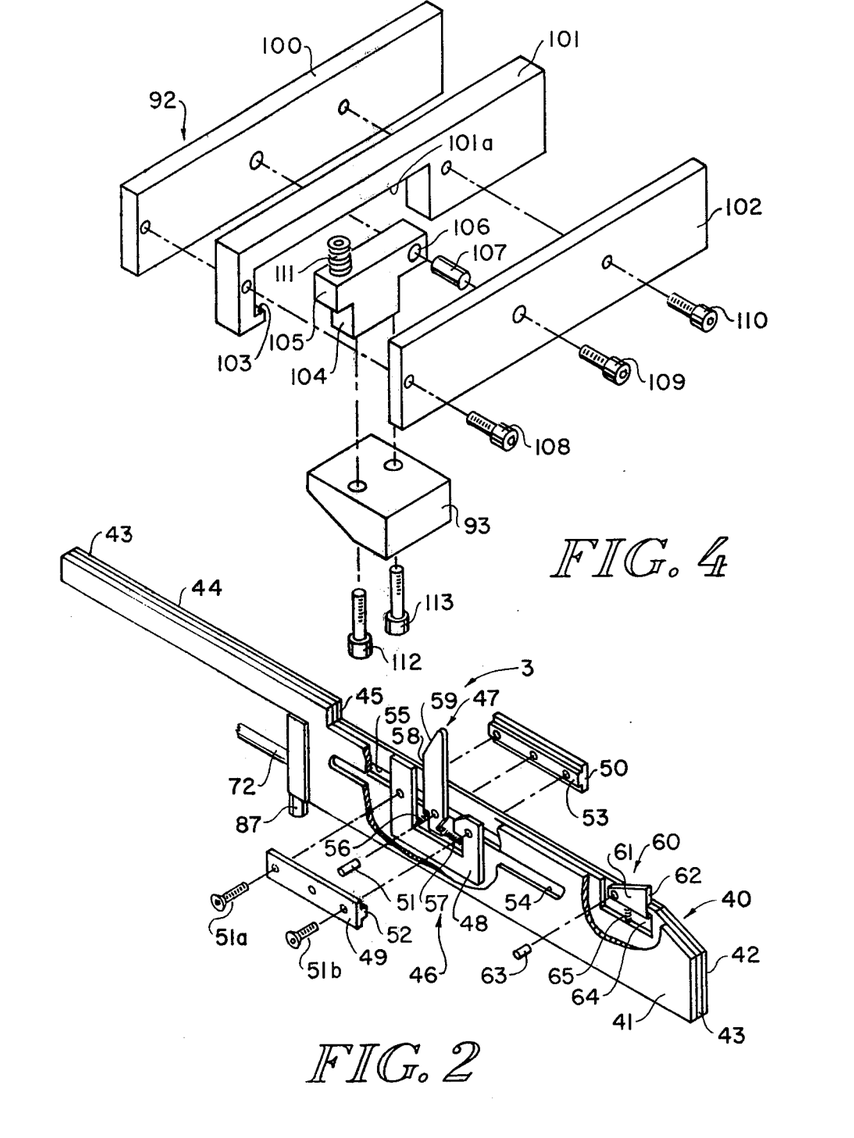
FIG. 2 is a partial exploded view of a carriage assembly according to the present invention.
FIG. 4 is an exploded view of a part of the top clamp assembly according to the present invention.

Referring to FIG. 2 as well as FIG. 1, there is provided in the carriage assembly 3 an elongated main body assembly designated generally as 40 comprising a pair of spaced side wall members 41 and 42 and an interior spacing member 43. Extending rearwardly from the main body assembly 40, there is provided an elongated tail member 44. At the forward end of the tail member 44 there is provided a rear stop 45. Forward of the rear stop 45 and movably mounted in a space provided therefor between the side wall members 41 and 42, there is provided a movable forward clamp assembly designated generally as 46.

In the forward clamp assembly 46 there is provided a movable clamping member 47. The movable clamping member 47 is pivotally connected between the upstanding legs of a U-shaped member 48 by a pair of elongated side bar members 49 and 50, a pivot pin 51 and a pair of screws 51a and 51b. From the inside surface of each of the bar members 49 and 50, there extends an elongated rectangular sliding member 52 and 53, respectively. The sliding members 52 and 53 are provided to slide in a pair of slots 54 and 55 provided therefor in the side members 41 and 42 of the assembly 3. At its lower end, the movable clamping member 47 is coupled to the U-shaped member 48 by means of a pair of spring members 56 and 57. The spring members 56 and 57 are provided for urging the movable clamping member 47 from a horizontal position wherein its upper surface 58 is substantially flush with the upper surface of the side members 41 and 42 to a substantially vertical position as shown. At its upper end, the movable clamping member 47 is provided with a beveled surface 59. The surface 59 is provided for sliding the member 47 under the top clamping assembly 6, as will be described below.

Forward of the top clamp member 47, there is provided a movable ejecting member assembly designated generally as 60. In the assembly 60, there is provided a movable ejecting member 61 having a substantially vertical face 62 on the forward surface thereof. The member 61 is pivotally connected by means of a pin 63 in a space 64 provided therefor between the side members 41 and 42. Beneath the member 61 there is provided a spring 65. The spring 65 is provided for urging the member 61 upwardly for engaging machined parts to eject the machined parts from the rail members 4 and 5 when the carriage assembly 3 is moved from the hopper 2 to the work station. The spring 65 also permits the member 61 to be depressed as the carriage 3 is drawn rearwardly beneath a work piece in the work station as the carriage assembly 3 is withdrawn to its initial position.

At its rear end, beneath the tail member 44, the assembly 3 is connected to a cylinder and piston assembly designated 70. In the assembly 70 there is provided either a pneumatic or hydraulic cylinder 71 and a piston 72. The piston is coupled to the assembly 3 and the cylinder 71 is coupled to the supporting member 16 in any suitable manner for moving the carriage assembly 3 between the hopper 2 and the work station.

Figure 3:
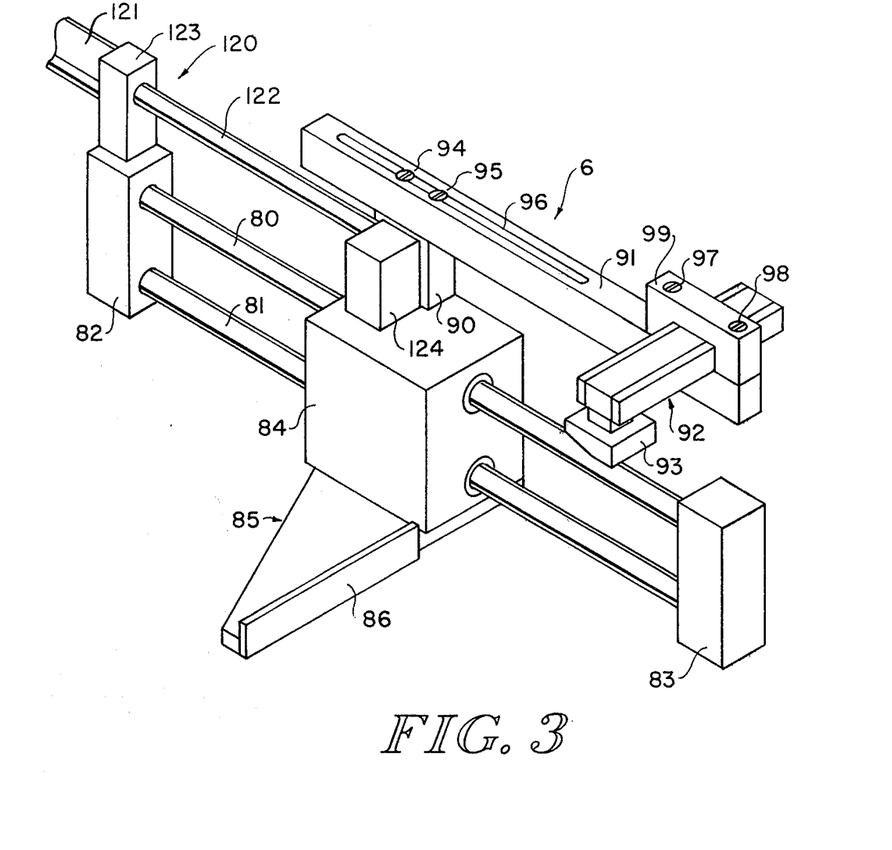
FIG. 3 is a perspective view of a top clamp assembly accorlding to the present invention.

Referring to FIG. 3, there is provided in the top clamp assembly 6 a pair of tubular rail member 80 and 81. Tubular rail members 80 and 81 are mounted at their opposite ends to a pair of supporting blocks 82 and 83.

Slidably mounted on the rails 80 and 81 there is provided a top clamping member sliding block 84. Extending outwardly from the base of the block 84, there is provided an elongated carriage pin engaging assembly 85. Along the forward edge of the member 85 there is provided an upstanding member 86 for engaging a pin 87 extending downwardly from the rear end of the side members 41 and 42 of the carriage assembly 3 beneath the rear stop 45, as shown more clearly in FIG. 1.

Extending from the top of the block 84 there is provided a plurality of top clamping member adjusting arms 90, 91 and 92. Extending downwardly from the exterior end of the arm 92 there is provided a top clamping member 93. Connecting the arm 91 to the arm 90 there is provided a pair of adjusting screws 94 and 95 suitably mounted in an adjustment slot 96 provided therefor for adjusting the longitudinal position of the arm 91 relative to the arm 90. At the opposite end of the arm 91 there is also provided a pair of adjusting screws 97 and 98 mounted in a block 99 for clamping the end of the arm 92 for adjusting the lateral position of the arm 92 relative to the arm 91.

Referring to FIG. 4, the arm 92 comprises three generally rectangular members 100, 101 and 102. At the forward end of the member 101, there is provided a U-shaped cut-out 101a having at the lower end of its forward leg an inwardly directed flange 103. The cut-out 101a is provided for receiving and containing a T-shaped top clamping member mounting member 104. The member 104 is provided with a forwardly extending horizontal portion 105 and a rearwardly extending portion 106. The under surface of the portion 105 is provided for engaging the upper surface of the flange 103 for supporting the forward end of the member 104. A bushing 107, extending through a hole provided therefor in the horizontal portion 106, is provided for pivotally mounting the member 104 in the cut-out 101a in member 101 between the members 100 and 102. Bolts 108, 109 and 110 are provided for bolting members 100, 101 and 102 together with the member 104 captured therebetween in the cut-out 101a of the member 101. Extending from the top of the horizontal portion 105 of the member 104 there is provided a spring 111. The spring 111 is provided for resiliently urging the top clamping member 93 downwardly against a work piece as the work piece is transported by the carriage assembly 3 from the hopper 2 to the work station. The top clamping member 93 is mounted to the bottom of the member 104 by means of a pair of bolts 112 and 113.

Referring again to FIG. 3, there is mounted to the top of the block members 82 and 84, a cylinder and piston assembly designated generally as 120. In the assembly 120 there is provided a pneumatic or hydraulic cylinder 121 and a piston 122. The cylinder 121 is mounted to the block 82 by means of a mounting block 123. The piston 122 is mounted to the block 84 by means of a block 124.

Figure 5:
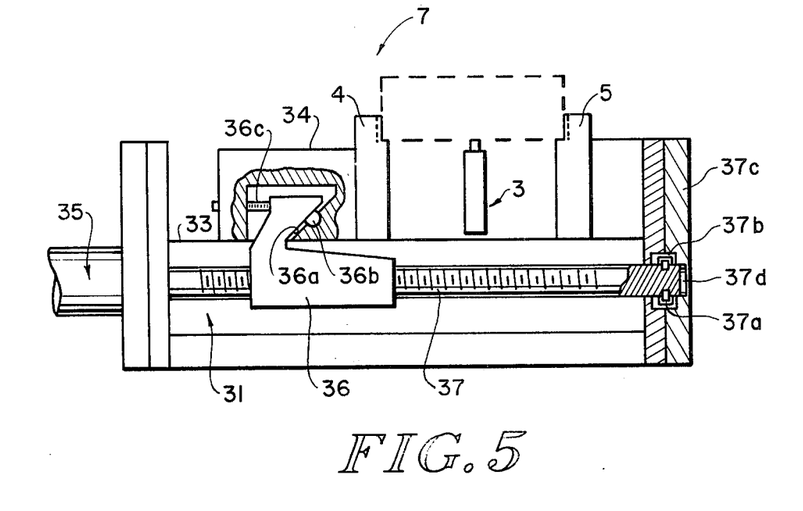
FIG. 5 is a partial cross section and partial end view of the apparatus of FIG. 1.

Referring to FIG. 5, there is provided in the assembly 7 a vise member 36 threadably mounted on an adjusting screw 37. The upper end of the member 36 has a beveled surface 36a sloping toward the rail member 4. The sloping member 36a bears against a flattened surface on a dowel 36b. An adjusting screw 36c serves to position the surface 36a against the dowel 36b. This arrangement serves to prevent vertical movement of the rail member 4 and block 34 as the clamping assembly 7 closes to clamp a work piece between the rail members 4 and 5. At the end of the screw 37, the screw 37 is rotatably supported by supporting members 37a in a cavity 37b provided therefor in a mounting block 37c. A clearance 37d is provided in the cavity 37b to accommodate movement of the assembly 7 as the assembly 7 opens and closes the rail members 4 and 5. A precision machine vise of the type described is commercially available from Kurt Manufacturing Company, Minneapolis, Minn.

Figure 6:
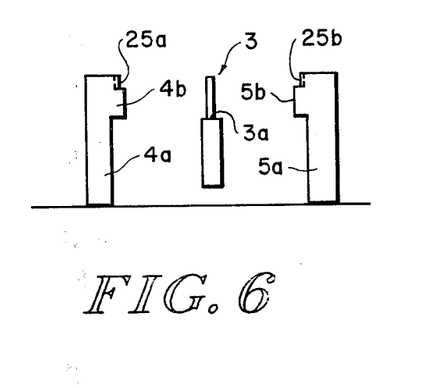
FIG. 6 is a partial end view of an alternative rail and carriage assembly according to the present invention.

Referring to FIG. 6, there is provided in an alternative embodiment of the rail members 4 and 5, a pair of rail members 4a and 5a. At the upper ends of the rail members 4a and 5a there are provided inwardly directed overhanging shoulder members 4b and 5b, respectively. The shoulders 4b and 5b are provided for supporting work pieces while overhanging the upper surface 3a of the carriage assembly 3 to accommodate work pieces having a smaller width than that which can be accommodated by the assembly 3 described above with respect to the previous figures. As in the assembly 3 described above with respect to the previous figures, the rail members 4a and 5a are also provided with offsets 25a and 25b, corresponding to the offset 25 described above with respect to FIG. 1.

Figure 7A:
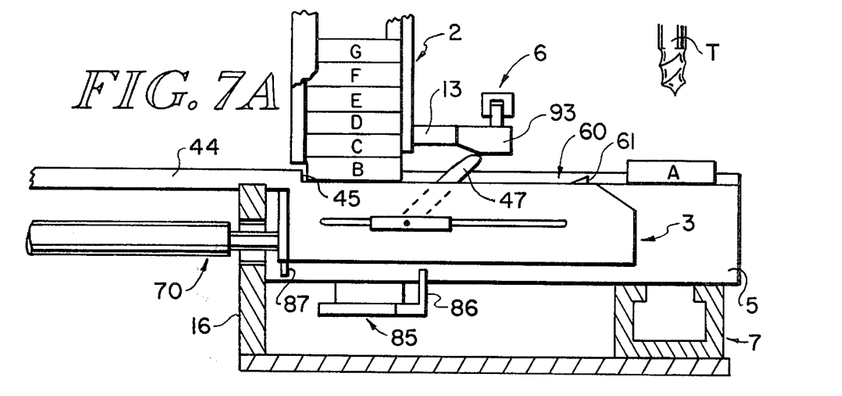
FIGS. 7A–7F are partial cross-sectional side elevation views of the apparatus in various stages of a cycle of operation.

Referring to FIG. 7A, the operation of the above described apparatus will now be described. Initially, there is assumed to be located in the work station of the apparatus a work piece A. Machining of the work piece A is assumed to have just been completed by a tool T which is being withdrawn from the work piece. Also, the top clamping assembly 6 and clamping assembly 7 are withdrawn to their initial positions. Succeeding work pieces designated respectively as B, C, D, E, F and G are located in the hopper 2. With the carriage assembly 3 located in its rearmost or initial position, the work piece B is about to be engaged by the rear stop 45 at the forward end of the tail 44 of the carriage assembly 3.

Figure 7B:
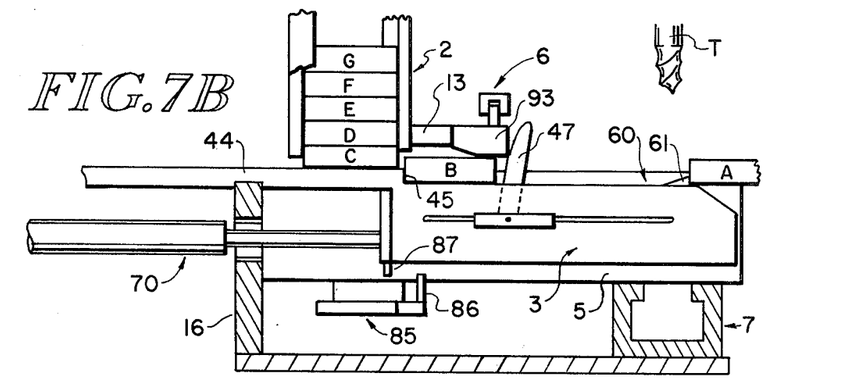

Referring to FIG. 7B, as the tool T is raised, a signal is generated actuating the cylinder and piston assembly in a conventional manner to advance the carriage assembly 3. As the carriage assembly 3 is moved forwardly by the cylinder and piston assembly 70, the work piece ejector assembly 60 begins to move the work piece A from between the rails 4 and 5. At the same time, the forward clamping member 47 begins to clear the top clamp member and rise against the forward surface of the work piece B. Also, the top clamping member 93 begins to engage the upper surface of the succeeding work piece B. With continued movement of the carriage assembly 3, the work piece C following the work piece B falls on to and slides along the top of the tail piece 44. It may be noted that at this point, the top clamp carriage pin engaging member assembly 85 is not yet engaged by the carriage pin 87.

Figure 7C:
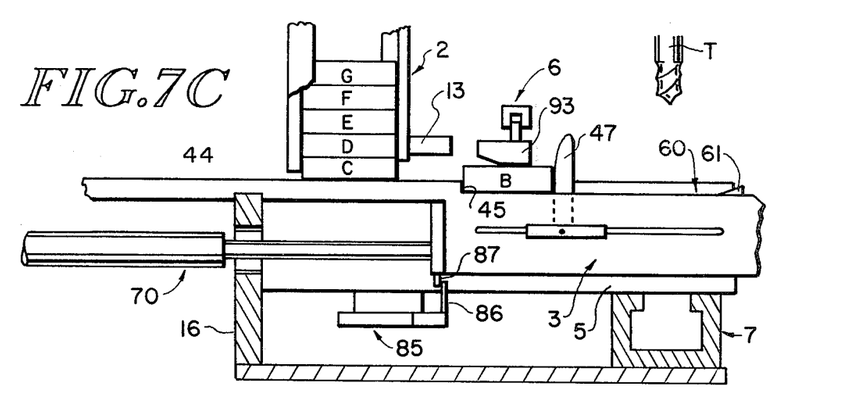

Referring to FIG. 7C, there is illustrated further forward movement of the carriage assembly 3. At this point, the pin 87 has engaged the member 86 of the assembly 85 and the work piece B is fully clamped by the forward clamping member 47 and the top clamping member 93 against the upper surface of the carriage assembly 3 and the rear stop 45 at the forward end of the tail 44.

Figure 7D:
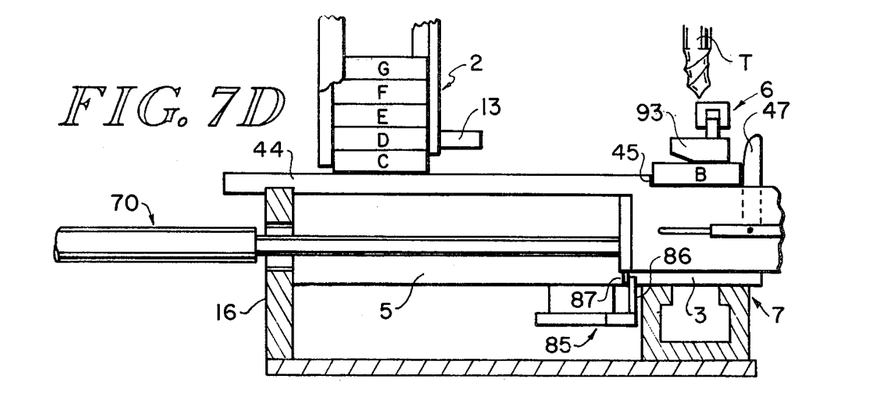

Referring to FIG. 7D, the top clamping assembly 6 is carried along by the carriage assembly 3 until the work piece B is located in the work station. When the work piece B is properly located in the work station, a signal by suitable conventional control is provided for injecting air or hydraulic fluid into the cylinder and piston assembly 7 for moving the rail member 4 toward the rail member 5 for clamping the work piece B therebetween. By the same signal, air or hydraulic fluid is injected in the cylinder and piston assembly 70 of the carriage assembly 3 and the cylinder and piston assembly 120 of the top clamping assembly 6 for withdrawing the assembly 3 and the assembly 6 to their initial position, as shown in FIG. 7A. After the carriage assembly 3 and top clamping assembly 6 are withdrawn, another signal is generated for lowering the tool T to the work piece to begin the machining thereof. The microswitches and air or hydraulic lines for operating the cylinder and piston assemblies in the assemblies 3, 6 and 7 are omitted as they are conventional and considered to be well understood by those skilled in the art.

Figure 7E:
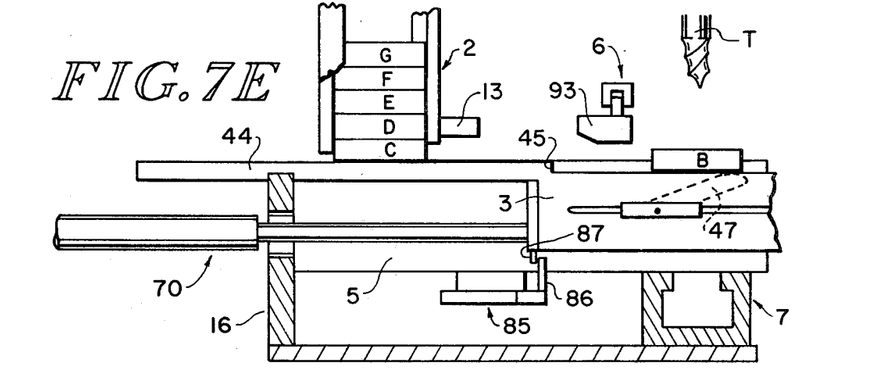

Referring to FIG. 7E, as the carriage assembly 3 and the top clamping member assembly 6 are being withdrawn, the clamping member 47 is caused to pass beneath the work piece B. As the member 47 passes beneath the work piece B, it is forced downwardly against the force of the springs 55 and 56.

Figure 7F:
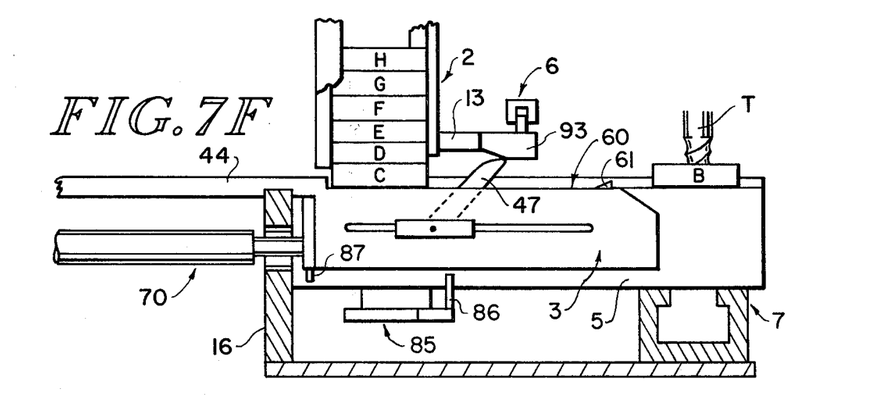

Referring to FIG. 7F, as the carriage assembly 3 continues to be withdrawn to its initial position, the movable ejecting member 61 also passes beneath the work piece B and is depressed as in the manner of the forward clamping member 46. At the same time as the carriage assembly 3 and top clamping assembly 6 are returned to their initial positions, the tool T is moved to the part B. When the tool T has finished machining the part B, another signal is generated as the tool raises from the work piece for initiating another cycle of operation beginning with the movement of the carriage assembly 3, as described above with respect to FIG. 7A.

An embodiment and several alternative arrangements of the present invention are described above for purposes of illustrating the present invention. It is, contemplated, however, that various changes may be made to the embodiments described without departing from the spirit and scope of the present invention. For example, while the principal components of the apparatus are made from steel for rigidity and reliability, other materials may also be used if suitable for the purpose. Also instead of using pneumatic cylinders for operating the clamping assembly 7, carriage assembly 3 and clamping assembly 6, hydraulic cylinder and piston assemblies may be used and even possibly suitable electrical solenoids or the like may be used. In the carriage assembly 3 and top clamping assembly 6, springs are employed for moving the clamping member 47, ejecting member 61 and clamping member 93. In place of the springs, suitable pneumatic, hydraulic or electrical solenoids may also be used. Over all, the apparatus illustrated is described for use with a vertical milling machine, drill or the like. It should be understood, however, that with suitable, relatively minor modifications, the apparatus may also be used with horizontal machines as well as dual vertical/horizontal machines. For these reasons, it is intended that the present invention not be limited to the specific embodiments described, but rather be determined by reference to the claims hereinafter provided and their equivalents.

What is claimed is:

1. An automatic work piece changer having repetitive cycles of operation for use with a milling machine, drill press and the like comprising:
   a work piece hopper for storing a plurality of work pieces to be machined;
   means for moving each of said work pieces in succession from said hopper to a work station for machining;
   means for clamping each of said work pieces on their side at said work station so as to prevent horizontal and vertical movement during said machining thereof and to permit working all of the top surfce of the work piece; and
   means for ejecting machined work pieces from said changer.

2. A work piece changer according to claim 1 wherein said hopper comprises a pair of spaced elongated members for holding said work pieces.

3. A work piece changer according to claim 2 wherein said pair of elongated members comprises a rear member and a front member with said front member being located in a position which allows the lowest work piece in said stack to pass beneath said front member as said work piece is transported to said work station.

4. A work piece changer according to claim 3 wherein said rear and said front member comprise a pair of elongated L-shaped members for slidably engaging opposite corners of said work pieces and means for adjusting the relative position of said L-shaped members so that said L-shaped members can store work pieces of differing sizes.

5. A work piece changer according to claim 4 wherein said means for adjusting the relative position of said L-shaped members comprises means for adjusting said front L-shaped member vertically and perpendicular to said rear L-shaped member in a direction parallel to the direction of travel of said work pieces and means for adjusting said rear L-shaped member laterally relative to said front L-shaped member.

6. A work piece changer according to claim 1 wherein said means for moving each of said work pieces in succession from said hopper to a work station for machining comprises:
   a pair of rail members for guiding each of said work pieces as they are moved from said hopper to said work station;
   means forming a carriage assembly for moving said work pieces on said rail members from said hopper to said work station; and
   means for clamping said work pieces as they are moved by said carriage means from said hopper to said work station.

7. A work piece changer according to claim 6 wherein each of said rail members comprises a horizontal surface for providing a support for said work pieces as said work pieces are moved along said rails, and a side wall which extends perpendicularly from the outside edge of said horizontal surface for guiding said work pieces laterally as said work pieces are moved along said rails.

8. A work piece changer according to claim 7 comprising means for adjusting the relative position of said rail members so that said rail members will accept work pieces of differing sizes.

9. A work piece changer according to claim 7 wherein said side walls of said rail members are located in a facing relationship for guiding a work piece therebetween on said horizontal surfaces as said work pieces are moved to said work station; and at least one of said side walls is provided with a tapered surface leading to a portion of said side wall which is provided with a predetermined offset toward said other sidewall at a predetermined location between said hopper and said work station for reducing the distance between said side walls at said work station; said reduction in distance serving to allow the following work piece in said hopper to be moved between said rails after said work piece in said work station is clamped in said work station.

10. A work piece changer according to claim 9 wherein said predetermined offset is approximately 0.010 inches and said tapered surface leading to said offset is approximately one inch long.

11. A work piece changer according to claim 6 wherein said carriage assembly for moving said work pieces on said rail members from said hopper to said work station comprises:
   means for movably mounting said carriage assembly between said rail members for movement between said hopper and said work station;
   means for moving said carriage means between said hopper and said work station;
   means forming a rear stop member for engaging the lowest work piece in said hopper as said carriage assembly is moved from said hopper toward said work station;
   means forming a forward clamping assembly for clamping said work piece against said rear stop member while said carriage assembly moves said work piece from said hopper to said work station; and
   means for supporting the remaining work pieces in said hopper after said lowest work piece is removed therefrom by a movement of said carriage assembly.

12. A work piece changer according to claim 11 wherein said means for supporting said remaining work pieces in said hopper comprises a tail member extending from said rear stop member having a surface on which the lowest of said remaining work pieces slides as said carriage assembly moves between said hopper and said work station.

13. A work piece changer according to claim 11 wherein said means for moving said carriage assembly between said hopper and said work station comprises:
   a cylinder and piston assembly; and
   means for coupling said assembly to said carriage means.

14. A work piece changer according to claim 11 wherein said means forming said rear stop member comprises means extending vertically from the top of said carriage assembly for engaging a lower rear edge of said work piece and said forward clamping assembly comprises a movable clamping member which is movable into a position for engaging a forward surface of said work piece.

15. A work piece changer according to claim 14 wherein said forward clamping assembly comprises means for adjusting the position of said movable clamping member relative to said rear stop member so that work pieces of different sizes can be accommodated.

16. A work piece changer according to claim 14 wherein said carriage assembly comprises a pair of spaced side wall members forward of said rear stop member and said forward clamping assembly comprises:
   means for pivotally mounting said movable clamping member between said spaced side wall members so that said movable clamping member is free to move between a generally horizontal position wherein the upper surface of said movable clamping member is substantially flush with the upper surface of said side wall members and a generally vertical position substantially perpendicular to said upper surface of said spaced side wall members; and
   means for urging said movable clamping member from its horizontal position to its vertical position.

17. A work piece changer according to claim 16 wherein said means for urging said movable clamping member from its horizontal position to its vertical position comprises spring means.

18. A work piece changer according to claim 6 wherein said clamping means comprises means forming a top clamping assembly for clamping said work piece in said carriage assembly as said carriage assembly moves said work piece from said hopper to said work station.

19. A work piece changer according to claim 18 wherein said top clamping assembly comprises:
   means forming a top clamping member for clamping the top of said work piece as said work piece is moved by said carriage assembly from said hopper to said work station;
   means for moving said top clamping member with said work piece clamped thereby as said work piece is moved by said carriage assembly from said hopper to said work station; and
   means for returning said top clamping member to its initial position after said work piece is moved from said hopper to said work station.

20. A work piece changer according to claim 19 wherein said top clamping assembly comprises means for adjusting the position of said top clamping member to accommodate different sizes of work pieces.

21. A work piece changer according to claim 19 wherein said means for returning said top clamping member to its initial position comprises:
   a cylinder and piston assembly; and
   means for coupling said cylinder and piston assembly to said top clamping assembly.

22. A work piece changer according to claim 19 wherein said top clamping assembly comprises:
   means for movably mounting said top clamping member in said top clamping assembly; and
   means for urging said top clamping member against the top of said work piece.

23. A work piece changer according to claim 22 wherein said means for urging said top clamping member against the top of said work piece comprises spring means.

24. A work piece changer according to claim 19 wherein said means for moving said top clamping member with said work piece clamped thereby comprises means for engaging said carriage assembly as said carriage assembly is moved from said hopper to said work station.

25. A work piece changer according to claim 24 wherein said means for engaging said carriage assembly comprises means for engaging a pin member extending from said carriage assembly.

26. A work piece according to claim 25 wherein said pin-engaging means comprises an elongated member for engaging said pin member after the position of said carriage assembly is changed relative to said pin-engaging means to accommodate work pieces of different sizes.

27. A work piece changer according to claim 1 wherein said means for moving each of said work pieces in succession from said hopper to said work station comprises:
 a pair of rail members for guiding each of said work pieces as they are moved from said hopper to said work station, at least one of said rail members is movable and said means for clamping each of said work pieces at said work station so as to prevent horizontal and vertical movement during machining thereof and to permit working all of the top surface of the work piece comprises means for moving said movable rail member toward the other of said rail members so as to clamp said work piece between said rails.

28. A work piece changer according to claim 27 wherein said means for moving said movable rail member toward the other of said rail members comprises:
 a cylinder and piston assembly; and
 means for coupling said cylinder and piston assembly to said movable rail member.

29. A work piece changer according to claim 1 wherein said means for moving each of said work pieces in succession from said hopper to said work station for machining comprises a pair of rail members for guiding each of said work pieces as they are moved from said hopper to said work station, and a carriage assembly for moving said work pieces on said rail members from said hopper to said work station; and wherein said means for ejecting machined work pieces from said changer comprises a work piece ejecting assembly located on said carriage means for engaging a machined work piece at said work station as said carriage means moves a succeeding work piece from said hopper toward said work station.

30. A work piece changer according to claim 29 wherein said carriage assembly comprises a pair of spaced side wall members and said work piece ejecting assembly comprises a movable ejecting member movably mounted between said spaced side wall members so that said movable ejecting member is free to move between a depressed position wherein the upper surface of said movable ejecting member is substantially flush with the upper surface of said spaced side wall members and an extended position wherein said movable ejecting member presents an engaging surface to a work piece located at said work station as said carriage assembly moves a succeeding work piece from said hopper toward said work station.

31. A work piece changer according to claim 30 wherein said work piece ejecting assembly comprises means for urging said movable ejecting member from said depressed position toward said extended position.

32. A work piece changer according to claim 31 wherein said means for urging said movable ejecting member toward its extended position comprises a spring means.

* * * * *